UNITED STATES PATENT OFFICE.

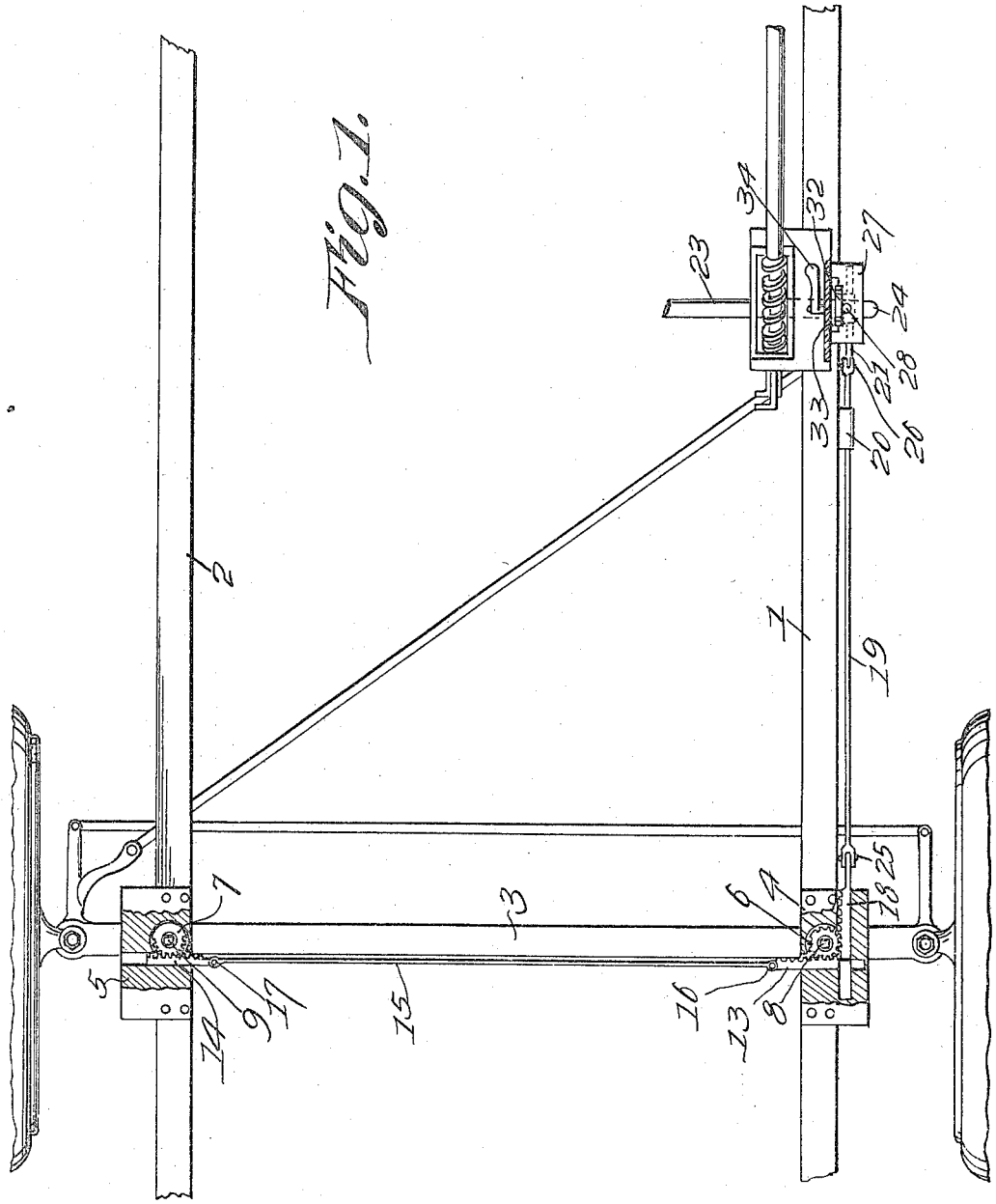

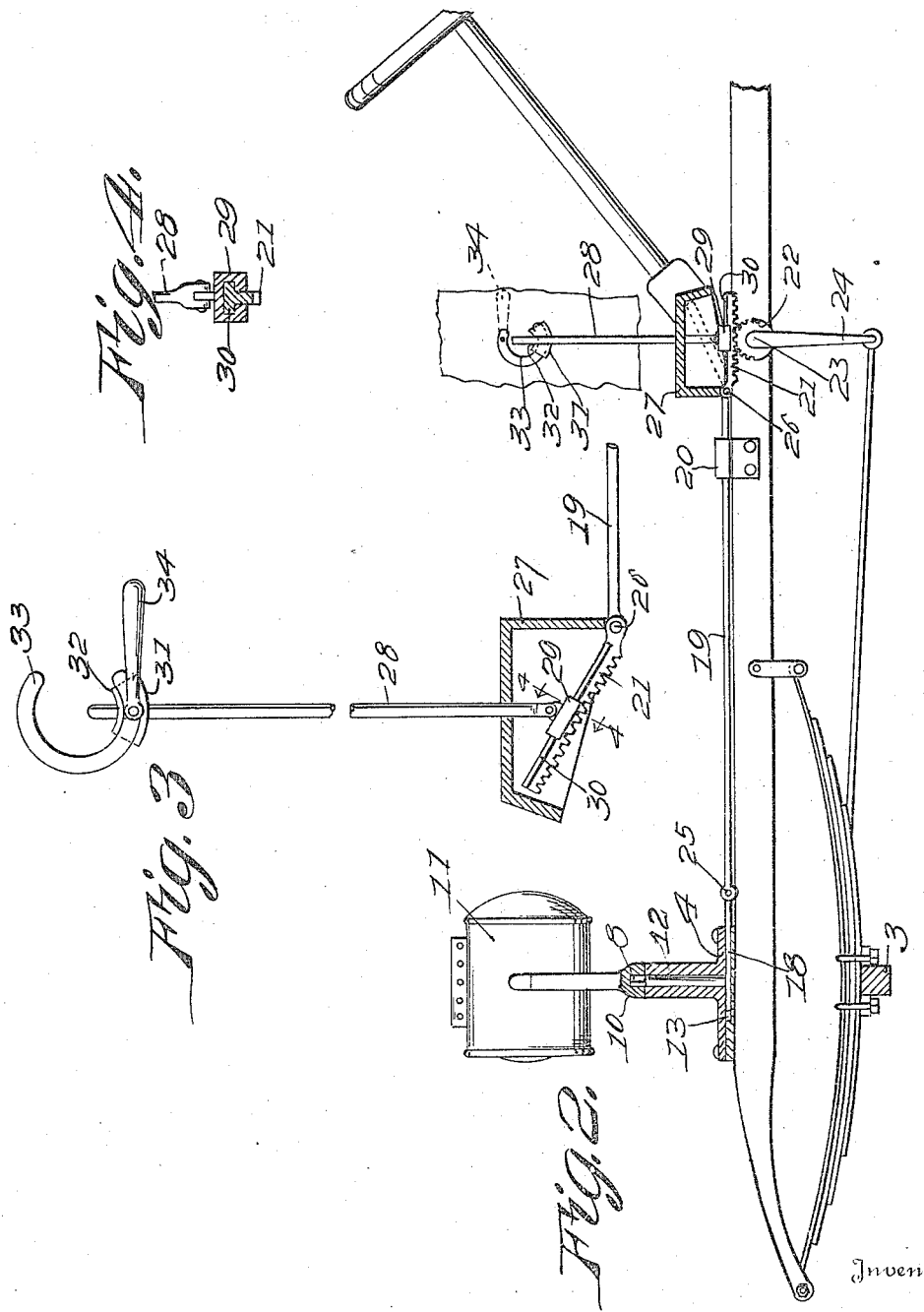

FRED R. FALKENSTEIN, OF BALTIMORE, MARYLAND.

HEADLIGHT FOR MOTOR-VEHICLES.

1,242,929.    Specification of Letters Patent.    Patented Oct. 16, 1917.

Application filed October 31, 1916.   Serial No. 128,766.

*To all whom it may concern:*

Be it known that I, FRED R. FALKENSTEIN, a citizen of the United States, residing at Baltimore, in the State of Maryland, have invented certain useful Improvements in Headlights for Motor-Vehicles, of which the following is a specification, reference being had therein to the accompanying drawing.

This invention relates to dirigible headlights for motor vehicles and the like, and one of the objects of the invention is to provide means whereby the headlights will be turned either to the right or to the left in direct accordance with the movement of the steering apparatus.

Ordinarily, headlights are held rigid with respect to the vehicle body or frame so that in making sharp turns the driver is unable to see the direction in which the vehicle is steered from a straight path. It is the purpose of my invention to cause the beam of light to be maintained at right angles to the wheel axles, so that in making a turn the beam will illuminate the path to be traveled by the wheels.

It is also the purpose of my invention to so mount the lamps on the frame or chassis that they will not be subjected to the vibration imparted to the wheels in traveling over inequalities in the road as would be the case should the lamps be mounted upon the wheel axles, or upon the springs, etc.

A further object of my invention is to provide means whereby the actuating means for driving the lamps may be thrown out of operative position, as would be desirable in the day time when the lamps are not being used.

In the drawings:

Figure 1 is a fragmentary plan view of a portion of a chassis, to which my invention is applied;

Fig. 2 is a side view of the front portion of the chassis or frame; and

Fig. 3 is a detail view of the throw-out device for the lamp actuating mechanism.

Fig. 4 is a sectional view on the line 4—4 of Fig. 3, looking in the direction of the arrows.

Referring now to the drawings, 1 and 2 designate the side rails of the chassis and 3 the front cross rail thereof. Upon the side rails 1 and 2 are base plates 4 and 5, upon which are mounted pinions 6 and 7, said pinions having upwardly projecting stems, with angular ends 8 and 9 to be received in sockets 10 of the lamps 11. The pinions and stems are protected by housings 12 which may be bolted to the plates 4 and 5, as best seen in Fig. 2. In order that the movements of the pinions 6 and 7 may be synchronized I have provided rack bars 13 and 14 meshing with said pinions and connected together by a link rod 15 having knuckle conneections 16 and 17 with respective racks. Therefore, it will be obvious that any motion imparted to one of the pinions will be communicated to the other pinion. Motion is imparted direct to the pinion 6 by a rack bar 18 which receives its motion from a reach rod 19 in a guide 20 on the vehicle frame, said rod being actuated by a rack 21 adapted to mesh with a pinion 22 on the shaft 23 receiving its motion from the usual steering mechanism, the shaft 23 being preferably the ordinary shaft which actuates the steering arm 24 in the usual manner. It will be observed that the reach rod 19 has knuckle connections 25 and 26 with the racks 18 and 21, respectively. Above the rack 21 is a casing or housing 27 through which projects a rod 28 carrying a slotted block 29 which receives a T-head 30 on the rack 21. The rod 28 is provided with arcuate flanges 31 and 32 which form an arcuate guide or seat for the eccentric 33 provided with a handle 34.

Under operating conditions the rack 21 will travel in a substantially horizontal plane, but when it is desired to throw out the lamp operating mechanism the operator will grasp the handle and swing the eccentric a sufficient distance, for example, in an arc of one hundred eighty degrees, and this will be effective in imparting a swinging motion to the rack 21, whereby the teeth of the rack 21 and the teeth of the pinion 22 will cease to mesh and any rotative movement imparted to the pinion 22 will not be imparted to the rack. When, however, it is desired to bring the rack into mesh with the pinion 22 the eccentric will be reversed and the block 29 will force the teeth of the rack into engagement with the pinion. At the same time the block 29 will constitute a guide for said rack 21 to keep it in proper relative position. When the rack 21 and pinion 22 are in mesh any movement imparted to the steering shaft 23 will impart a like movement to the rack 21, the rod 19, the racks 18, 13 and 14. Therefore, any deflection of the wheels from a straight path will cause a similar deflection of the beam of light so that the lamps may be swung either to the right or to the left according to the deflection of the wheels and the steering mechanism. By positioning the lamps upon the chassis or frame of the vehicle any liability of damage due to excessive vibration on account of the wheels traveling over an uneven surface will be reduced to a minimum and the whole structure will be quite stable due to the fact that the racks 13, 14 and 18 are guided in the recesses or guides formed by the plates 4 and 5 and the housings 12.

While I have shown one form of mechanism for disconnecting the rack 21 from the pinion 22 it is obvious that other forms of releasing mechanism may be employed if desired.

Having thus described my invention, I claim:

1. A vehicle frame, laterally swinging lamps on said frame, a steering mechanism, a pinion on said steering mechanism, a T-shaped rack bar for engagement with the pinion, connections between the rack bar and the lamps for actuating the same on movement of the rack bar by said pinion, a block slidably engaging the T portion of the rack bar, a lifting rod pivoted to the block, a manually operated arcuate shaped eccentric movably supported adjacent to the rod, and a guide on said rod slidably engaging the eccentric for the raising and lowering of the rod on movement of said eccentric.

2. A vehicle frame, laterally swinging lamps on said frame, a steering mechanism, a pinion on said steering mechanism, a T-shaped rack bar for engagement with the pinion, connections between the rack bar and the lamps for actuating the same on movement of the rack bar by said pinion, a block slidably engaging the T portion of the rack bar, a lifting rod pivoted to the block, a manually operated arcuate shaped eccentric movably supported adjacent to the rod, a guide on said rod slidably engaging the eccentric for the raising and lowering of the rod on movement of said eccentric, and a housing on the frame for said rack bar.

In testimony whereof I affix my signature.

FRED R. FALKENSTEIN.

Copies of this patent may be obtained for five cents each, by addressing the "Commissioner of Patents, Washington, D. C."